(12) United States Patent
Matsunaga

(10) Patent No.: US 9,349,096 B2
(45) Date of Patent: May 24, 2016

(54) CONTEXT-AWARENESS SYSTEM AND METHOD OF FORMING EVENT DATA

(75) Inventor: Toshihiko Matsunaga, Osaka (JP)

(73) Assignee: Oki Electric Industry Co., Ltd., Tokyo (JP)

(*) Notice: Subject to any disclaimer, the term of this patent is extended or adjusted under 35 U.S.C. 154(b) by 256 days.

(21) Appl. No.: 13/335,979

(22) Filed: Dec. 23, 2011

(65) Prior Publication Data

US 2012/0191637 A1    Jul. 26, 2012

(30) Foreign Application Priority Data

Jan. 21, 2011    (JP) .................................. 2011-011088

(51) Int. Cl.
*G06N 5/02*    (2006.01)

(52) U.S. Cl.
CPC ....................................... *G06N 5/02* (2013.01)

(58) Field of Classification Search
USPC .......................................................... 706/47
See application file for complete search history.

(56) References Cited

U.S. PATENT DOCUMENTS

| | | | | |
|---|---|---|---|---|
| 5,740,322 A | * | 4/1998 | Inoue | G06N 7/046 706/2 |
| 6,173,207 B1 | * | 1/2001 | Eidson | 700/14 |
| 7,716,651 B2 | | 5/2010 | Cukierman et al. | |
| 2004/0254731 A1 | * | 12/2004 | Murphy | 702/4 |
| 2006/0039413 A1 | * | 2/2006 | Nakajima et al. | 370/521 |
| 2008/0031139 A1 | * | 2/2008 | Muro et al. | 370/237 |
| 2008/0283599 A1 | * | 11/2008 | Rasband | G06K 7/0008 235/439 |
| 2010/0076769 A1 | * | 3/2010 | Yu | 704/269 |

* cited by examiner

*Primary Examiner* — Kakali Chaki
*Assistant Examiner* — Michael Zidanic
(74) *Attorney, Agent, or Firm* — Rabin & Berdo, P.C.

(57) ABSTRACT

A context-awareness system has an event data producer for forming event data from node data including a node value and node information, a context producer, and an event data manager for storing event data formation suppression information and event data conversion rules. The context producer sends the number of entries of event data (the number of inputs) to the event data manager per unit time. The manager sends to the event data producer the event data formation suppression information and event data conversion rules corresponding to the number of inputs. The event data producer forms event data depending on the event data formation suppression information and event data conversion rules corresponding to the number of inputs. Appropriate context information is formed without increasing the amount of resources when data including values related to events are entered in large amount and frequently.

14 Claims, 14 Drawing Sheets

FIG. 3

| 113a | 113 | |
|---|---|---|
| NODE MANAGEMENT INFORMATION ||| 
| NODE ID (SENSOR ID) | PRIORITY ORDER FOR FORMING EVENT DATA | NODE TYPES (SENSOR TYPES) |
| 1 | 2 | TEMPERATURE SENSOR |
| 2 | 1 | HUMAN PRESENCE SENSOR |
| ⋮ |||

| NODE ID (SENSOR ID) | EVENT DATA CONVERSION CONDITIONS (TIME, TIMEP, IN SECONDS) | HOLDING CONDITIONS (TIME, TIMEP, IN SECONDS) | MAXIMUM NUMBER OF FORMING EVENT DATA (TIMES/MIN) | EVENT VALUE | RULE NO. OF CONVERSION RULES |
|---|---|---|---|---|---|
| 1 | TIME ≧ TIMEP+60 TEMPERATURE IS HIGHER OR LOWER BY 2°C OR MORE | TIME < TIMEP+60 | 1 | VALUE | 1 |
| 2 | STATUS=FALSE VALUE≧3 | — | 5 | TRUE | 2 |
| 2 | STATUS=TRUE VALUE<3 TIME≧TIMEP+2 | VALUE<3 | 5 | FALSE | 3 |
| 2 | STATUS=NULL VALUE≧3 | TIME | 5 | TRUE | 4 |
| 2 | STATUS=NULL VALUE<3 | TIME | 5 | FALSE | 5 |
| | ...... | | | | |

| NODE DATA MANAGEMENT INFORMATION | | | |
|---|---|---|---|
| NODE ID (SENSOR ID) | NODE VALUE (SENSOR VALUE) | TIME (IN MINUTES) | FORMATION FLAG |
| 1 | 12 | 1 | UNFORMED |
| 1 | 11 | 2 | UNFORMED |
| 2 | 2 | 2 | FORMED |
| ⋮ | | | |

FIG. 6

| NODE TYPES (SENSOR TYPES) | EVENT DATA CONVERSION CONDITIONS (TIME, TIMEP, IN SECONDS) | HOLDING CONDITIONS (TIME, TIMEP, IN SECONDS) | MAXIMUM NUMBER OF FORMING EVENT DATA (TIMES/MIN) | EVENT VALUE | EVENT DATA FORMATION SUPPRESSION LEVEL |
|---|---|---|---|---|---|
| TEMPERATURE SENSOR | TIME≧TIMEP+10 | TIME<TIMEP+10 | — | VALUE | 0 |
| HUMAN PRESENCE SENSOR | VALUE≧3 | — | — | TRUE | 0, 1 |
| HUMAN PRESENCE SENSOR | VALUE<3 | — | — | FALSE | 0, 1 |
| TEMPERATURE SENSOR | TIME≧TIMEP+60 | TIME<TIMEP+60 | 1 | VALUE | 1 |
| TEMPERATURE SENSOR | TIME≧TIMEP+60 TEMPERATURE IS HIGHER OR LOWER BY 2°C OR MORE | TIME<TIMEP+60 | 1 | VALUE | 2 |
| HUMAN PRESENCE SENSOR | STATUS=FALSE VALUE≧3 | — | 5 | TRUE | 2 |
| HUMAN PRESENCE SENSOR | STATUS=TRUE VALUE<3 TIME≧TIMEP+2 | VALUE<3 | 5 | FALSE | 2 |
| HUMAN PRESENCE SENSOR | STATUS=NULL VALUE≧3 | TIME | 5 | TRUE | 2 |
| HUMAN PRESENCE SENSOR | STATUS=NULL VALUE<3 | TIME | 5 | FALSE | 2 |

*FIG. 7*

| EVENT DATA FORMATION SUPPRESSION INFORMATION ||
|---|---|
| INPUT NUMBER P OF EVENT DATA (EVENTS/S) | EVENT DATA FORMATION SUPPRESSION LEVEL |
| $0 \leqq P < 50$ | 0 |
| $50 \leqq P < 90$ | 1 |
| $90 \leqq P$ | 2 |

FIG. 10

| INPUT DATA (NODE DATA) ||
| :---: | :---: |
| TIME (IN SECONDS) | NODE VALUE (SENSOR VALUE) |
| 0 | 0 |
| 1 | 0 |
| 2 | 12 |
| 3 | 0 |
| 4 | 10 |
| 5 | 0 |
| 6 | 0 |
| ⋮ ||

FIG. 11

| OUTPUT DATA (EVENT DATA) ||
|---|---|
| DATA NO. | EVENT VALUE (NODE VALUE INSIDE PARENTHESES) |
| 0 | FALSE (0) |
| 2 | TURE (12) |
| 6 | FALSE (0) |
| ⋮ | |

FIG. 12

| INPUT DATA (NODE DATA) ||
|---|---|
| TIME (IN MINUTES) | NODE VALUE (SENSOR VALUE) |
| 0 | 0 |
| 1 | 0 |
| 2 | 2 |
| 3 | 2 |
| 4 | 3 |
| 5 | 4 |
| 6 | 7 |
| ⋮ | ⋮ |

FIG. 13

| OUTPUT DATA (EVENT DATA) ||
|---|---|
| DATA NO. | EVENT VALUE |
| 0 | 0 |
| 2 | 2 |
| 5 | 4 |
| 6 | 7 |
| ⋮ | |

FIG. 14

| OUTPUT DATA (EVENT DATA) ||
|---|---|
| DATA NO. | EVENT VALUE |
| 0 | 0/3 (=0.0) |
| 4 | 7/3 (≒2.3) |
| 6 | 14/3 (≒4.7) |
| ⋮ | |

} DIFFERENCE IS 2.3 ≥ 2
} DIFFERENCE IS 2.4 ≥ 2

CONTEXT-AWARENESS SYSTEM AND METHOD OF FORMING EVENT DATA

BACKGROUND OF THE INVENTION

1. Field of the Invention

The present invention relates to a context-awareness system, and more particularly to a context-awareness system wherein event data are formed by collecting and processing input data including values related to events to produce context information from the event data. The invention also relates to a method for forming event data in the system.

2. Description of the Background Art

In general, there has been proposed a service providing system wherein input data transmitted from nodes containing a sensor and an RFID (Radio-Frequency Identification), that is, node data, are collected and processed to grasp situations, i.e. events, such as locations, time and circumstances where persons or objects stay, to provide users with services based on the grasped results, i.e. context information. Such a service providing system is disclosed by U.S. Pat. No. 7,716,651 B2 to Cukierman, et al., for example.

The solution taught by Cukierman, et al., uses a computer system for storing and providing context information regarding an execution environment such as physical locations of a user, persons who can contact with the user in the physical locations, and an activity condition of the user, the context information being used for intelligently adapting the computer to the execution environment. Cukierman, et al., also proposes a context platform extensible and supporting context information data of any size and/or format as well as any number of executable programs for providing and using the context information.

However, in the context platform of Cukierman, et al., when the numerous events vary frequently so that the context information has to be updated at high frequencies and then there is a need to deal with the context information of large volume, the arithmetic processor cannot keep pace with such a great increase in processing and there occurs a possibility that the context information is not appropriately updated. Consequently, in order to perform a large amount of processing, the system of Cukierman, et al., necessitates a high-performance arithmetic processor and a large volume memory space, and thereby has a problem that the amount of resources is increased.

SUMMARY OF THE INVENTION

It is an object of the present invention to provide a context-awareness system and a method that can produce appropriate context information without increasing the amount of resources even when a large amount of data including values related to events are frequently input.

In accordance with the present invention, a context-awareness system comprises an event data producer for using node data including node values related to events to form event data including event values converted from the values related to events; a context producer for forming context information from the event data; and an event data manager for storing information on suppression of event data formation (which may be referred to as event data formation suppression information) and event data conversion rules specifically prescribed for respective pieces of event data formation suppression information. In the event data formation suppression information, described is information for suppressing the number of formations of the event data depending on the number of entries of the event data into the context producer (which may be referred to as the number of inputs or the input number) per unit time. The context producer sends the number of entries of the event data per unit time to the event data manager. The event data manager selects, among the stored event data formation suppression information and event data conversion rules, the corresponding event data formation suppression information and event data conversion rules corresponding to the number of inputs to send the selected event data formation suppression information and event data conversion rules to the event data producer. The event data producer uses the event data formation suppression information and event data conversion rules sent from the event data manager and corresponding to the number of inputs to form the event data.

In accordance with the present invention, it is possible to produce appropriate context information without increasing the amount of resources even when the large amount of data including values related to events are input frequently. It is therefore possible to enhance the quality of services offered to users by executing applications.

BRIEF DESCRIPTION OF THE DRAWINGS

The objects and features of the present invention will become more apparent from consideration of the following detailed description taken in conjunction with the accompanying drawings in which:

FIG. 3 shows an example of node management information stored in the node manager shown in FIG. 2;

FIG. 4 shows an example of event data control information stored in the event data information management controller shown in FIG. 2;

FIG. 5 shows an example of node data management information stored in the node data manager shown in FIG. 2;

FIG. 6 shows an example of event data management information stored in the event data manager shown in FIG. 1;

FIG. 7 shows an example of event data formation suppression information stored in the event data information management controller shown in FIG. 1;

FIG. 10 shows an example of node data input to the event data producer shown in FIG. 1;

FIG. 11 shows an example of event data output by the event data producer shown in FIG. 1;

FIG. 12 shows another example of node data input to the event data producer shown in FIG. 1;

FIG. 13 shows another example of event data output by the event data producer shown in FIG. 1; and FIG. 14 shows another alternative example of event data output by the event data producer shown in FIG. 1.

DESCRIPTION OF THE PREFERRED EMBODIMENT

Now, a preferred embodiment of the present invention will be described in detail with reference to the accompanying drawings. In the figures, the components and elements are merely schematically depicted to the extent that the present invention can be sufficiently understood. Therefore, the present invention is not to be restrictively comprehended only by the illustrated embodiment.

Figure 1:
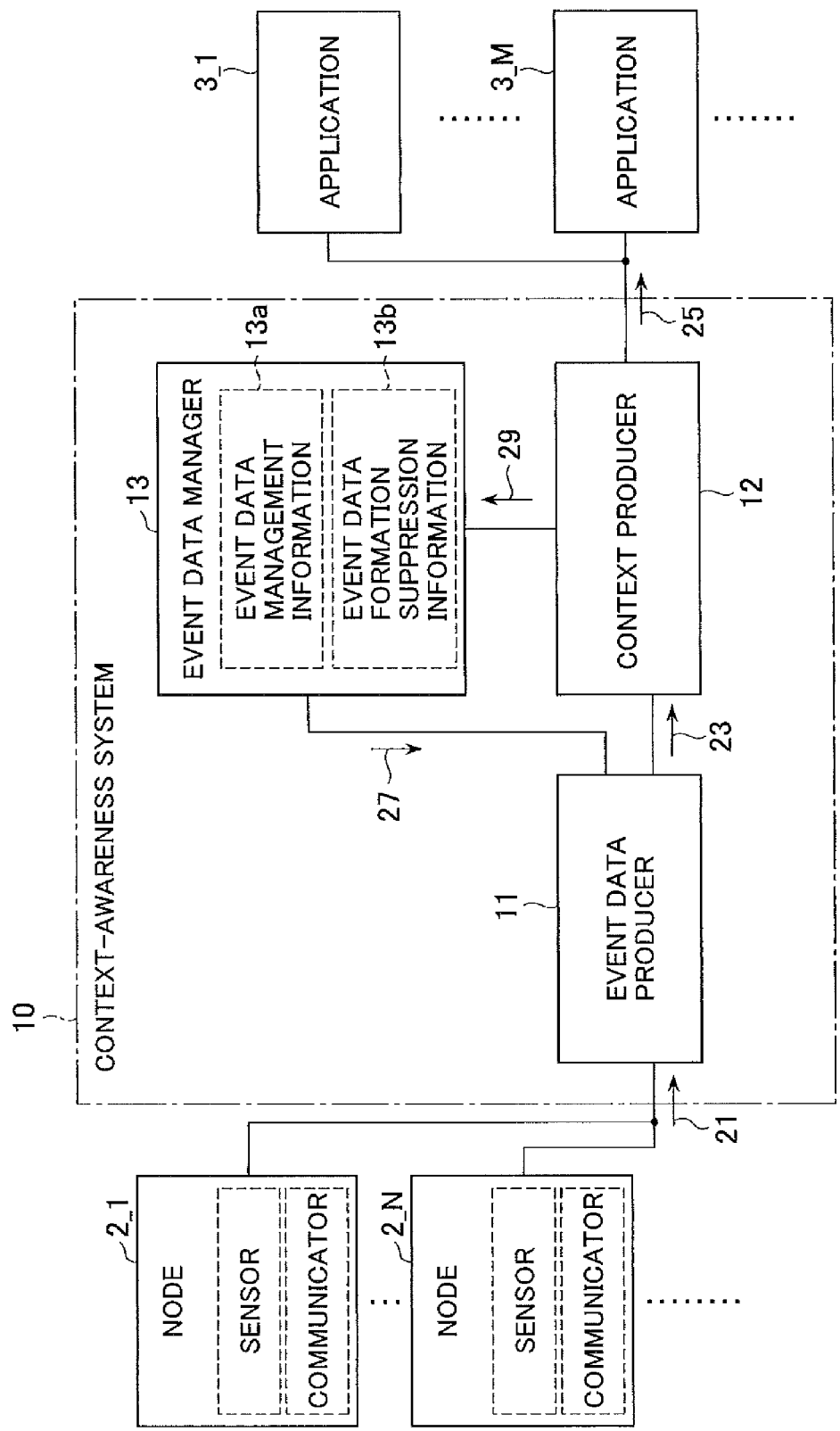
FIG. 1 is a schematic block diagram showing the configuration of a context-awareness system in accordance with an illustrative embodiment of the present invention.

FIG. 1 shows a context-awareness system 10 in accordance with the illustrative embodiment, as well as one or plural network nodes 2_1 to 2_N (N is a positive integer) each of which may be a device for giving data including values related to events to the context-awareness system 10, and one or plural application executions 3_1 to 3_M (M is also a positive integer) each of which has a function of executing an operation based on context information 25 offered from the context-awareness system 10. The context-awareness system 10 is communicably connected with the nodes 2_1 to 2_N and application executions 3_1 to 3_M via a telecommunications network.

The nodes 2_1 to 2_N may be of the same structure as each other. Each of the nodes 2_1 to 2_N is adapted to obtain or receive values related to events, which may be, for example, the situation or circumstance of a person or an object, to output node data 21 including the values as well as a node ID (IDentification) specifically allotted to the node beforehand to the context-awareness system 10. In the illustrative embodiment, each of the nodes 2_1 to 2_N is a device, such as a sensor device, including a sensor for capturing values related to the events and a communicator for communicating with the context-awareness system 10, as presented by dashed line boxes in FIG. 1. The sensor may be various kinds of sensors, e.g. temperature sensor and human presence sensor. Note that the nodes may be any kinds of device having functions of obtaining or receiving information on the events and sending information regarding the obtained information to the system 10. The nodes may be a device serving as a detector or receiver that is not provided with a sensor. For example, the nodes may be a device having an RFID (Radio Frequency Identification) set therein and a communication function.

Each of the application executions 3_1 to 3_M is adapted to execute an application utilizing context information transmitted from the context-awareness system 10, for example, to provide services to users. In the illustrative embodiment, each of the application executions 3-1 to 3-M may be a device for executing an application by using context information to provide services to the users.

The context-awareness system 10 communicates with one or plural nodes 2_1 to 2_N over a sensor network regulated by a wireless communication standard, such as ZigBee (trademark), to receive node data transmitted from the nodes 2-1 to 2-N. The context-awareness system 10 also communicates with the application executions 3_1 to 3_M, which may be a computer system or the like, for example, over a telecommunications network, such as a LAN (Local Area Network), the Internet, or the like.

As shown in FIG. 1, the context-awareness system 10 has an event data producer 11, a context producer 12, and an event data manager 13. Between the event data producer 11, the context producer 12 and the event data manager 13, the communication may be performed over a network such as a LAN. For example, the event data producer 11 may be a device installed in an ordinary home or company to communicate over a LAN with the context producer 12 and the event data manager 13, both of which may be devices installed as equipment of a service provider. Note that, in a system where each of the nodes 2_1 to 2_N is a sensor device including a sensor and a communicator, the event data producer 11 and event data manager 13 may also be referred to as a sensor event producer and a sensor event manager, respectively.

The illustrative embodiment of the context-awareness system 10 is depicted and described as configured by separate functional blocks, such as event data producer 11. It is however to be noted that such a depiction and a description do not restrict those functional blocks to an implementation only in the form of hardware but may partially or entirely be implemented by software, namely, by a computer, or processor system, which has computer programs installed and functions, when executing the computer programs, as part of, or the entirety of, those functional blocks. In this connection, the word "circuit" or "device" may be understood not only as hardware, such as an electronics circuit, but also as a function that may be implemented by software installed and executed on a computer.

With reference to FIG. 1, the event data producer or forming device 11 is adapted to form or produce, from node data including a node value and node information, event data 23 including the node information and an event value converted from the node value.

The node data is output by the node and input to the event data producer 11, and includes a value related to an event, that is, node value, and node information, such as node ID, concerning a node outputting the node value. When a node is a sensor device, data output by the sensor device may be referred to as, for example, sensor data, which may include a sensor value and a sensor ID. Note that, when there is no necessity to identify a node, for example, node data may include a node value relating to an event and not node information on the node.

The node value is a value concerning an event output by a node, and specifically is a measured or detected value, for example. In the illustrative embodiment, by converting a node value by the event data producer 11, an event value is formed. When a node is a sensor device, the node value and event value may be referred to as, for example, a sensor value and a sensor event value, respectively, related to an event detected by the sensor in the sensor device.

The node information is information on a node, e.g. sensor device, outputting a node value. In the illustrative embodiment, the node information includes, for example, a node identification (ID), such as ID number or code, specifically allotted to a particular node. In a system in which a node is a sensor device, the node identification may be a sensor ID, which is an example of node identification. The node information also includes information on node types, such as temperature sensors or human presence sensors, and positions where the nodes are installed.

The event data is output by the event data producer 11, and includes a node ID and an event value. In a system in which the node is a sensor device including a sensor, the event data may be referred to as a sensor event.

The context producer or forming device 12 has functions of receiving the event data sent from the event data producer 11 and providing context information whose data format is adapted for an application. The context producer 12 also has a function of sending the formed context information to the application executions 3_1 to 3_M.

The event data manager or managing device 13 is adapted to control the forming of event data. More specifically, in the illustrative embodiment, the event data manager 13 stores event data formation suppression information and event data conversion rules prescribed for respective pieces of event data formation suppression information. The event data formation suppression information and event data conversion rules are depicted in the figure with a reference numeral 27. The event data formation suppression information is for use in controlling the formation or production of event data so as not to exceed a predetermined upper limit corresponding to the number of entries of event data to the context producer 12 per unit time, which is depicted in the figure with a reference numeral 29. Specifically, the event data formation suppression information may include information on the priority order in forming event data, which is determined in advance, for example, depending on the node information. The event data conversion rules stipulate how to determine an event value contained in event data and determined in advance, for example, depending on the number of entries of event data and the node information. Note that the event data conversion rules may be determined in advance depending on the number of entries of input event data and the type of a node, or on the number of entries of input event data and the position at which a node is installed.

These nodes 2_1 to 2_N, event data producer 11, context producer 12 and event data manager 13 may be used for providing services to users. In an exemplified system, the nodes 2_1 to 2_N may be placed in the premises of a user's home and the event data producer 11 may be placed in a home gateway installed in the same premises, and further the context producer 12 and the event data manager 13 may be placed in the server of a context-awareness data provider, so that the server may execute an application to provide services to the user.

Alternatively, the nodes 2_1 to 2_N, the event data producer 11, the context producer 12 and the event data manager 13 may be provided in a building for use in providing services to the users of the building. Specifically, the nodes 2_1 to 2_N may be placed on the floors or in the rooms and the event data producer 11 may be placed in devices on the floors or in the rooms, and the context producer 12 and the event data manager 13 may be placed in the server of the building administrator, so that the server may execute an application to provide the users with services.

Of course, the configuration of the context-awareness system 10 shown in FIG. 1 is only illustrative and may be changed or modified, as desired. For example, some or all of the devices within the context-awareness system 10 may be incorporated in the same apparatus.

Now, reference will be made to FIG. 2 to describe the configuration of the event data producer 11 of the embodiment shown in FIG. 1. The event data producer 11 is adapted to collect and process node data including a value, such as node value, related to an event and a node ID to thereby form or produce event data including an event value converted from the value related to the event and a node ID to provide the formed event data to the context producer 12. More specifically, the event data producer 11 has functions of receiving the node data transmitted from the one or plural nodes 2_1 to 2_N, and of forming one or more sets of event data based on the node data to provide the formed sets of event data to the context producer 12. There maybe provided multiple event data producers 11 and there are no limitations on the number of the nodes 2_1 to 2_N to be treated or covered by one event data producer 11. Alternatively, it is possible to restrict the number of the nodes 2_1 to 2_N to be treated by one event data producer 11.

Figure 2:
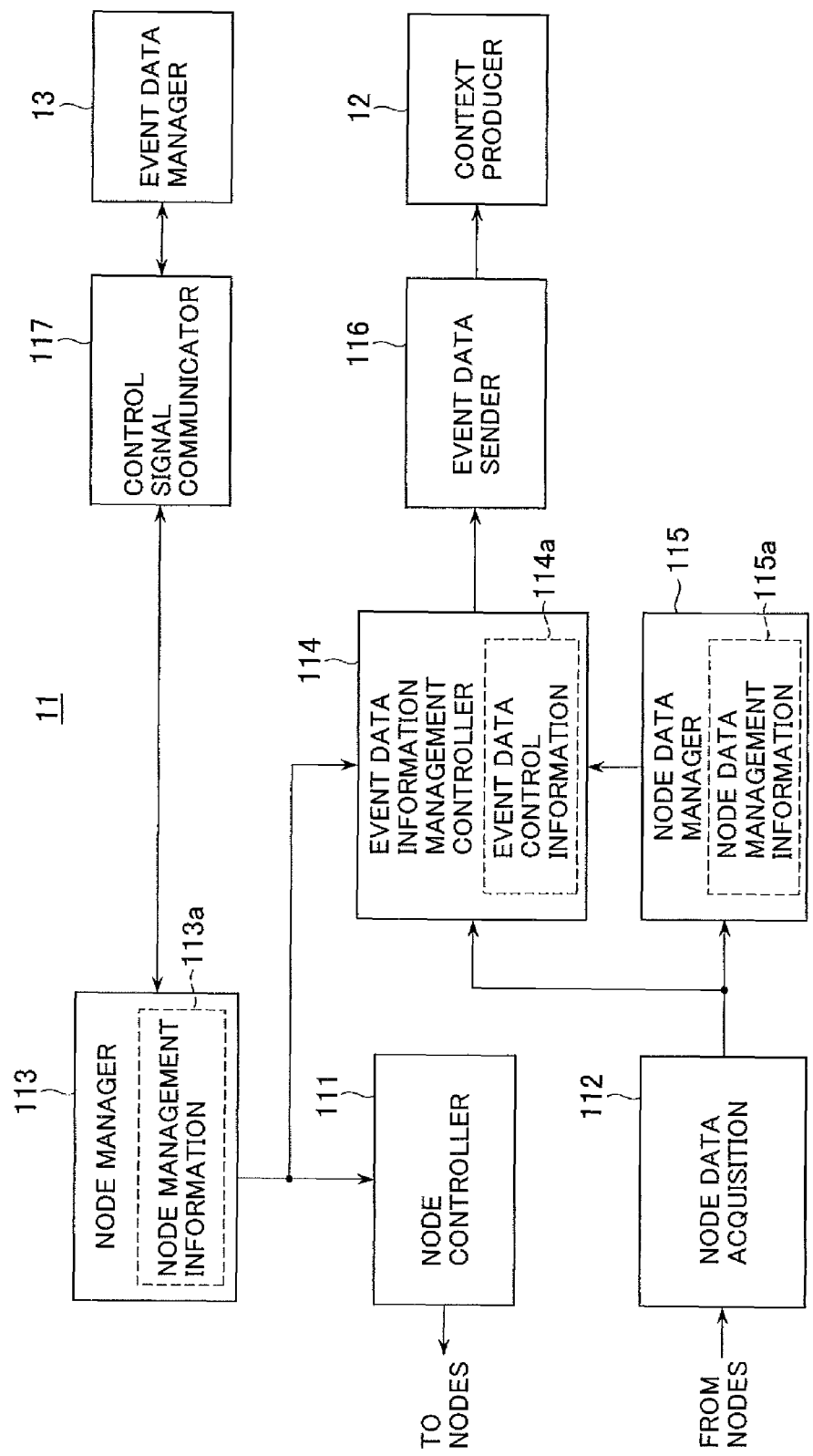
FIG. 2 is a schematic block diagram showing the configuration of the event data producer shown in FIG. 1.

As shown in FIG. 2, the event data producer 11 includes a node controller 111 for individually sending control signals to the nodes; a node data acquisition 112 for receiving node data from the nodes; a node manager 113 for storing node management information 113a, which will be described with reference to FIG. 3; an event data information management controller 114 for storing event data control information 114a, described with reference to FIG. 4; a node data manager 115 for storing node data management information 115a, described with reference to FIG. 5; an event data sender 116 for sending event data to the context producer 12; a control signal communicator 117 for performing communications with the event data manager 13; and a storage, not shown, for storing various kinds of information or data.

The node controller 111 in the event data producer 11 is adapted to individually control the nodes. In the illustrative embodiment, the controller 111 has a function of sending control data including the ID of an objective node of interest to that objective node, which may be designated by 2_N, where N is arbitrary natural number, to have the objective node transmit node data.

The node data acquisition 112 in the event data producer 11 has a function of receiving node data sent from any one or more of the nodes 2_1 to 2_N. The node data includes the node ID and a node value of a transmitter node having transmitted the data.

The node manager 113 has a function of storing information on, for example, the ID of an objective node, the kind of the nodes, and a method for obtaining node data from the nodes. More specifically, in the illustrative embodiment, the node manager 113 stores node management information 113a including, as shown in FIG. 3, node IDs, node information and node types in terms of the respective node IDs. In the example of FIG. 3, the node manager 113 stores, as the node information 113a, numbers denoting the node IDs and node types, such as temperature sensor or human presence sensor. The node manager 113 also stores, as the node information 113a, the priority order of forming event data, which is determined in advance with the node type taken into account, a node installation position and other factors. The priority order may be set in advance to distinguish priority nodes from non-priority nodes in case of an event data formation suppressing order being generated. In the example of FIG. 3, the priority order "1" denotes a priority node, while the priority order "2" denotes a non- or second-priority node.

Referring again to FIG. 2, the node manager 113 also has a function of communicating with the event data manager 13. In the illustrative embodiment, the node manager 113 sends to the event data manager 13 the node ID or type information of any one of the nodes 2_1 to 2_N under control of the event data producer 11 to have the data manager 13 search for information on a method for controlling the nodes, a method for converting node data into event data and the priority order of the event data conversion, for example, and sending the searched-for information to the node manager 113. The node manager 113 then passes the received information on the event data conversion rules to the event data information management controller 114.

The event data information management controller 114 is adapted to convert a node value in the node data received by the node data acquisition 112 into an event value to thereby form event data. In the illustrative embodiment, in order to perform this conversion, the event data information management controller 114 receives information about a method of conversion to event data from the event data manager 13 via the node manager 113, and stores the received information as event data control information 114a. The event data information management controller 114 then uses the stored information 114 and node data newly received by the node data acquisition 112 as well as the node value stored in the node data manager 115 to form the event data.

FIG. 4 shows an example of event data control information 114a stored in the event data information management controller 114 shown in FIG. 2. As seen from the figure, the event data information management controller 114 stores, as the event data control information 114a, for example, node IDs, conversion conditions for each node under which event data is converted, holding conditions under which the node data is kept stored in the node data manager 115, the maximum number of times forming event data per minute (times/min), and an event value when the event data conversion conditions are satisfied.

Note that the example shown in FIG. 4 is in the situation where the node manager 113 has caused the event data manager 13 to search for the sixth to tenth lines in FIG. 6 of the event data management information 13a, described later, and sending the searched-for information to the event data producer 11. Therefore, the event data information management controller 114 stores the event data control information 114a corresponding to the sixth to tenth lines of the event data management information 13a as shown in FIG. 4, and thus the conversion conditions, holding conditions, maximum number and event values will be described later with reference to FIG. 6.

Referring again to FIG. 2, the node data manager 115 has a function of temporarily storing node values, as node data management information 115a, received by the node data acquisition 112.

FIG. 5 shows an example of node data management information 115a stored in the node data manager 115 shown in FIG. 2. In FIG. 5, the node data manager 115 stores, as the node data management information 115a, node IDs and the most recently received node value for each node ID, as well as time at which the node data is received by the event data producer 11. Note that, in this example, the node data manager 115 stores, as the time, a period elapsing since the event data producer 11 is activated. The node data manager 115 also stores, as flags, information indicating whether the event data is formed (formed) or not (unformed) for each node. The node data manager 115 keeps storing, i.e. holds, the node data only during the period prescribed by the holding conditions under which the node event information is managed, and, upon expiry of the time, the node data is erased.

Referring again to FIG. 2, the event data sender 116 in the event data producer 11 has a function of sending to the context producer 12 event data having a node ID, an event value, and so forth. The control signal communicator 117 has a function of performing communications with the event data manager 13.

Well, reference will be made again to FIG. 1 to describe specifically the configuration of the context producer 12 and the event data manager 13. The context producer 12 constitutes the essential part of the context-awareness platform. Specifically, the context producer 12 has a function of forming context information using event data received from the event data producer 11 to provide the context information to the correspondent application executions 3_1 to 3_M. Furthermore, the context producer 12 has functions of counting the number of entries of event data received from the event data producer 11 per unit time, that is, the number of inputs, and giving a notice of the number of inputs to the event data manager 13.

The event data manager 13 is adapted to collectively control management information on the context-awareness system 10. In the illustrative embodiment, the event data manager 13 has storage for storing event data management information 13a, which will be described with reference to FIG. 6, on the event data treatable by the context producer 12. The event data management information 13a includes, for example, information on the node IDs of objective nodes or node types, e.g. sensor types, and information indicating the rules for converting from node values, e.g. sensor values, to event values, e.g. sensor event values, performed in the event data producer 11. In addition, the event data manager 13 stores event data formation suppression information 13b, which will be described with reference to FIG. 7. In this centralized manner, the event data manager 13 manages the management information on the context-awareness system 10 during a control operation, such as priority control for determining which event data should preferentially be formed. It is therefore possible to maintain the fairness between those nodes, and also to advantageously control the number of entries of event data in the context producer 12, as well as to advantageously control a delay time when the event data is formed with delay.

FIG. 6 shows an example of event data management information 13a stored in the event data manager 13 shown in FIG. 1. As shown in FIG. 6, the event data management information 13a is set in advance to include node types, e.g. sensor types, event data conversion conditions under which the event data is converted, event data holding conditions, the maximum number of times forming event data per unit time for each node, event values, and an event data formation suppression level at which the event data conversion rules are applied. The event data formation suppression level is for use in suppressing the event data producer 11 from forming event data according to the number of entries of event data in the context producer 12. In the illustrative embodiment, the event data formation suppression level is represented by values "0", "1", and "2" as shown in FIG. 6. The lower the level value of the event data formation suppression, that is, it approaches "0", the less the suppression, and correspondingly, the higher the level value, the more the suppression.

In FIG. 6, the event data conversion conditions may be applied to the conversion performed in the event data producer 11. For example, as shown in the second line of the figure, the event data holding condition "time<timep+10" means that the event value attributed to formation of the previous event data is to be held in the event data producer 11 until a period of 10 seconds elapses from the instant "timep" at which the previous event data was formed. More specifically, in the case where the node type is a "temperature sensor" and the event data formation suppression level is "0", the event data producer 11 follows the event data conversion condition to form the event data at the instant "time" when a period of 10 seconds has elapsed from the instant "timep" at which the previous event data was formed, i.e. the conversion condition, time≥timep+10, was satisfied.

Also, as shown in the sixth line of FIG. 6, for example, in the case where the node type is a "temperature sensor" and the event data formation suppression level is "2", the event data is formed only when a period of 60 seconds has elapsed from the instant "timep" at which the previous event data was formed, i.e. the condition, time>timep 60, was satisfied. At the same time, the temperature at the present instant "time" becomes higher or lower, by 2° C. or more, than the temperature at the instant "timep" at which the previous event data was formed.

In FIG. 6, the column "event value" represents values after conversion. For example, as shown in the second line, the event value "value" means that the event producer 11 uses for the conversion a node value as the event value when the node type is a "temperature sensor" and the event data formation suppression level is "0". Also, for example, in the third line of the figure, the event value "TRUE" means that when the node type is a "human presence sensor" sensing the presence of a person, e.g. a moving object of interest, and the event data formation suppression level is "0" or "1", the event producer 11 sets the event value to "TRUE" if the node value is 3 or more, i.e. value ≥3.

Further, for example, as shown in the forth line of FIG. 6, when the node type is a "human presence sensor" and the event data formation suppression level is "0" or "1", and also the node value is less than 3, i.e. value<3, the event producer 11 sets the event value to "FALSE".

Further as shown in FIG. 6, the illustrative embodiment thus defines the event data formation suppression level and event data conversion conditions, and it is thus possible to decrease formations of event values. Also, as shown in the second and third lines, for example, the event data producer 11 is adapted such as to send an event value to the context producer 12 only if the node value "value" has varied when the node type is a "human presence sensor" and the event data formation suppression level is "0" or "1" with the variation of event values restricted to the couple of levels, "TRUE" and "FALSE", whereby the amount of formed event values can be further reduced.

Also, in the illustrative embodiment, as shown in the sixth to tenth lines, when the event data formation suppression level is "2", the condition regarding the previous event value or the condition regarding the elapsed time is added, whereby the amount of event data to be formed by the event data producer 11 can be further reduced.

For example, as shown in the seventh line of FIG. 6, the condition "status=FALSE" is added, so that the event data is formed when the node value is greater or equal to "3" and the event value of the previous measurement, that is, "status", is equal to "FALSE". Also, for example, as shown in the eighth line, the condition "time≥timep+2" is added, so that the event data is formed at the time when a period of two seconds has elapsed from the previous event data formation time "timep", and also when all other conditions, such as "status=TRUE" and "value>32", are satisfied. In this way, comparison is performed between the event values "status" or node values at the previous measurement time (timep) and the event or node value at the current time (time) to use the amount of variation thus obtained by the comparison for forming the event data, thus making it possible to suppress the formation of the event data with little influence on the formation of the context.

Note that, in FIG. 6, although the event data conversion conditions are listed for each node type, the event data conversion conditions may alternatively be listed for any categories other than the node type. For example, the event data conversion conditions may be listed for each node ID or for individual information on the installed positions of nodes, i.e. the positions in which nodes are installed. Also, when there are plural nodes adjacent to each other, one of these nodes may have its event data formation suppression level set higher than the rest.

Further in FIG. 6, the column "maximum number of forming event data" represents the maximum number of event data (times/min) to be formed per unit time, one minute in this example. As shown in the column, the illustrative embodiment does not allow event data to be formed more than five times per minute.

In the illustrative embodiment, in order to control the formation of event data, the event data manager 13 also stores an event data formation suppression information 13b as shown in FIG. 7. In FIG. 7, the event data manager 13 stores, as the event data formation suppression information 13b, threshold values for the number of entries of event data P in the context producer 12 per unit time. More specifically, the event data manager 13 defines, as shown in FIG. 7, 100 events/second as the maximum allowable number of entries of event data in the context producer 12 per unit time, 50 events/second as a threshold value for event data formation suppression level 1, and 90 events/second as a threshold value for event data formation suppression level 2. The number of entries of event data is measured by the context producer 12 per unit time, e.g. per second, and given to the event data manager 13. The event data manager 13 holds or retains the current event data formation suppression level, and when the number of entries of event data P per second reaches or exceeds the threshold value in the current event data formation suppression level, the manager 13 sends an event data formation suppressing instruction signal to the event data producer 11, and also when the number of entries of event data P per second becomes below the threshold value in the current event data formation suppression level, the event data manager 13 sends to the device 11 a signal for cancelling the suppression of the formation or production of the event data. In this way, in the illustrative embodiment, the context-awareness system 10 has a function of monitoring the number of the event data entered to the context producer 12, and hence the load, to provide an event data formation suppressing instruction to the event data producer 11 when the load becomes heavier. The event data formation suppressing instruction may be provided to the event data producer 11 via the event data manager 13.

Figure 8:
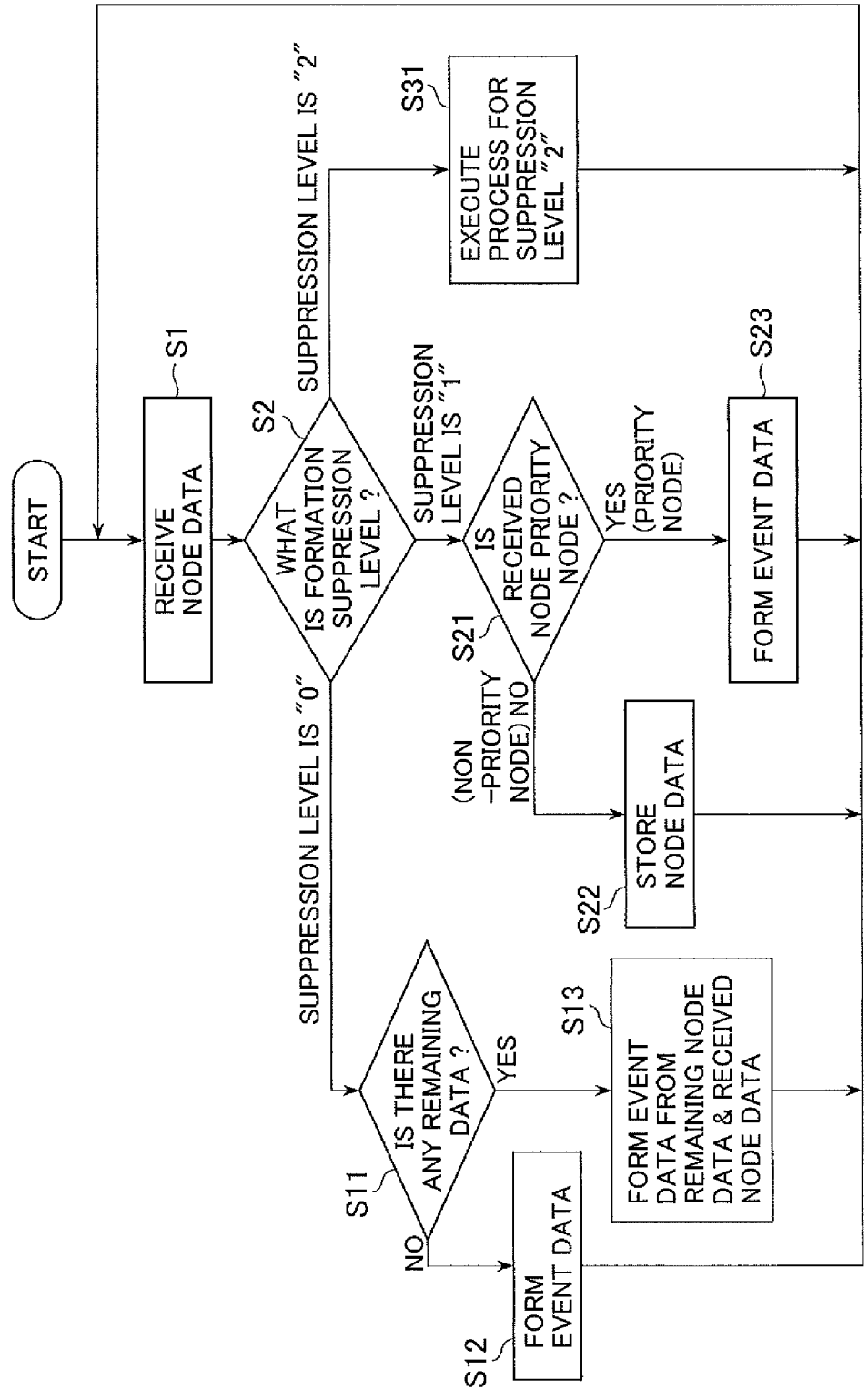
FIGS. 8 and 9 are a flowchart useful for understanding a process operated by the event data producer shown in FIG. 1 in accordance with the embodiment.

In order to facilitate understanding the features of the present invention, reference will be made to FIG. 8 showing, in a flow chart, how event data is formed in the context-awareness system 10 with the use of an inhibitory control for the event data formation. In brief, in FIG. 8, the context producer 12 counts the number of entries of event data to itself per second, namely, input number, and gives a notice of the input number to the event data manager 13. When receiving the input number of event data from the context producer 12 per unit time, the event data manager 13 selects, from the stored event data formation suppression information and event data conversion rules, event data formation suppression information and an event data conversion rule corresponding to the received input number, and sends them to the event data producer 11. The event data producer 11 forms event data on the basis of the event data formation suppression information and event data conversion rule corresponding to the received input number sent from the event data manager 13.

First, when any one of the nodes 2_1 to 2_N is connected with the event data producer 11, a massage containing the node ID of the connected node, i.e. node data, is sent to the event data producer 11. The event data producer 11 receives the node data by the node data acquisition 112 and starts to perform an operation for forming the event data to send an inquiry message in which the node ID and node data are described to the event data manager 13 (step S1).

On receiving the inquiry message, the event data manager 13 sends back to an event data producer 11 reply message in which the method for controlling the node, priority order for forming event data and event data conversion rules are described.

At this time, the event data manager 13 concurrently receives the number of entries of event data P per second from the context producer 12 and references the threshold value as shown in FIG. 7 to decide and hold the event data formation suppression level. When the number of entries of event data P per second reaches or exceeds the threshold value in the current event data formation suppression level, the manager 13 sends an event data formation suppressing instruction signal to the event data producer 11. When the number of entries of event data P per second becomes below the threshold value in the current event data formation suppression level, the event data manager 13 sends to the device 11 a signal for cancelling the suppression of formation of the event data. In the illustrative embodiment, the event data manager 13 sends the event data formation suppression level "0", "1" or "2" in the form of signals.

Note that, in the illustrative embodiment, although the event data producer 11 receives from the event data manager 13 an event data formation suppression level in parallel with the reply message, the event data formation suppression level may be described into the reply message. Also, although in the illustrative embodiment the context producer 12 counts the input number of the event data, the context-awareness system 10 may be configured such that the input number of the event data may be noticed from the event data producer 11 to the event data manager 13, or the input number of the event data may be detected by the event data manager 13.

When having received the reply message from the event data manager 13, the event data producer 11 has the node manager 113 update the corresponding node management information 113a, e.g. node type and control information such as priority order for forming event data, to the node ID as shown in FIG. 3, and passes the event data control information contained in the reply message from the event data manager 13 to the event data information management controller 114 to have the latter update the event data control information 114a, such as event data conversion conditions and event values, as shown in FIG. 4. The event data producer 11 also checks the event data formation suppression level of the time when the device 11 receives the node data (step S2).

If the event data formation suppression level is "0" in step S2, then the event data producer 11 determines whether or not there is any data, that is, there is remaining data stored in the storage in step S22, described later, in other words, determines whether or not the event data formation suppression level was "1" or higher until just before (step S11).

If there remains no data (No in step S11), then the event data producer 11 forms event data with the use of the received node data (step S12). Otherwise, namely, if there is the remaining data (Yes in step S11), then the event data producer 11 forms event data from the node data in the remaining data, which regard the node having the corresponding node ID, and also from the received node data received from the node having the corresponding node ID (step S13). When being connected to multiple nodes, the event data producer 11 forms plural sets of event data, for example. The event data producer sends the formed event data to the context producer 12.

Note that, although, in steps S11 to S13, the event data producer 11 forms the event data from remaining data and received node data and sends the formed event data to the context creating device 12 when the event data producer 11 receives the new node data and the event data formation suppression level is "0" and also there is the remaining data, the event data producer 11 may form the event data from the remaining node data and received node data when having the remaining data and receiving a signal for canceling the suppression of event data formation. It is thereby possible to avoid sending simultaneously a large volume of event data to the context producer 12 and also to prevent the event data formation suppression level from being exceeded again.

If the level of suppressing the event data formation is "1" in step S2, then the event data producer 11 refers to the priority order stored in the node manager 113 to determine whether or not the node ID regarding the received node data is the non-priority node or the priority node (step S21). When the node ID is the non-priority node, that is, when the node data is transmitted from the non-priority node (No in step S21), the event data producer 11 does not produce the event data and stores the received node data as the remaining data in the node data manager 115 as shown in FIG. 5 (step S22).

By contrast, if the node ID is the priority node, that is, when the node data is transmitted from the priority node (Yes in step S21), then the event data producer 11 forms event data from the received node data to send the formed event data to the context producer 12 (step S23).

If the level of suppressing the event data formation becomes "2" in step S2, then the event data producer 11 suppresses the production of event data for all nodes, such that, for example, the event data producer 11 forms event data once every twice reception of the node data transmitted from the same node (step S31).

Figure 9:
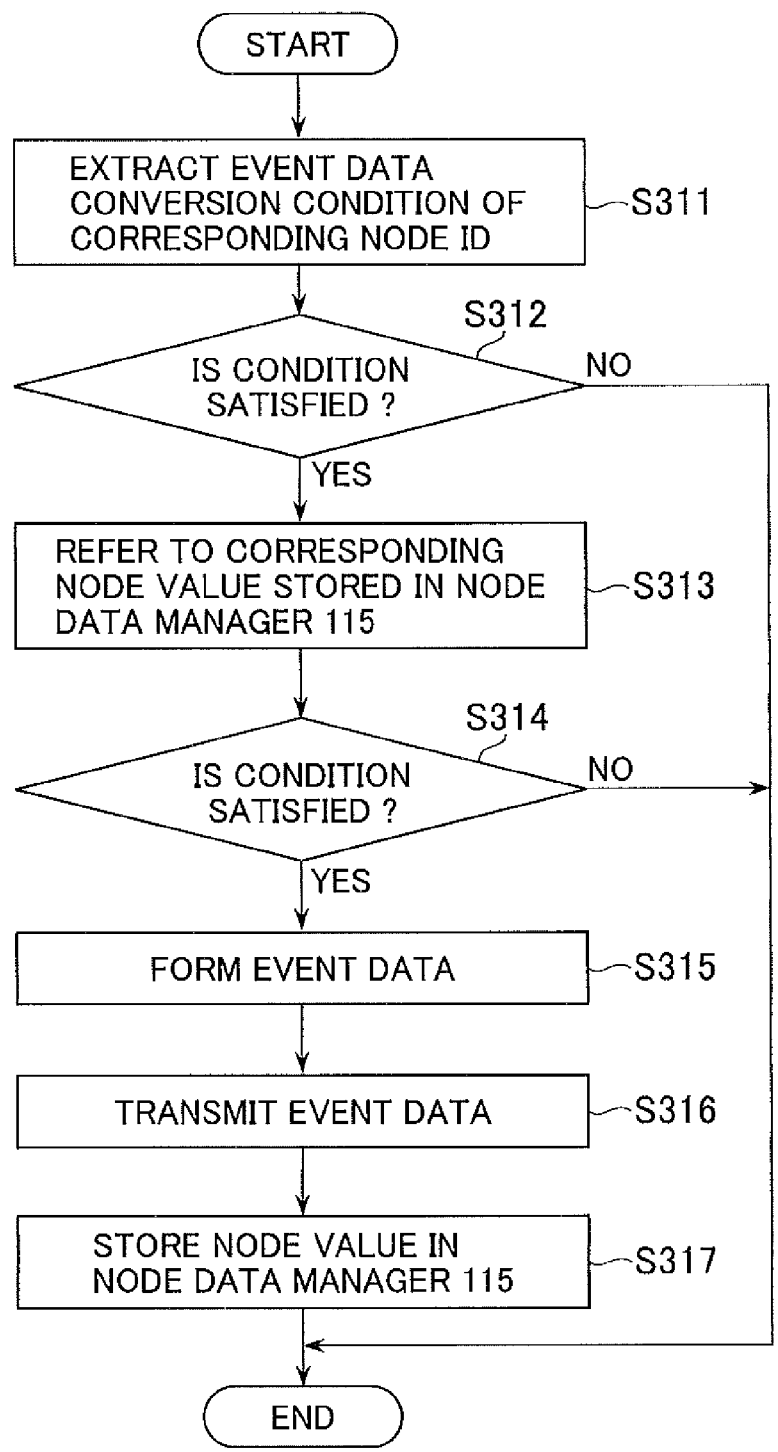

Note that, in step S31, if a simple control is performed for suppressing the formation of event data, there is the possibility that services offered by the application execution portions 3_1 to 3_N are affected, so that the presentation or quality of the services will deteriorate, for example. Therefore, in the illustrative embodiment, when the event data formation suppression level is "2", the suppression control is executed as shown in FIG. 9, for example, in order to prevent dropouts of information which is necessary for executing the applications in the application executions 3_1 to 3_N.

Well, reference will be made to FIG. 9 to describe how the event data producer 11 forms the event data when the event data formation suppression level is "2". The flowchart shown in FIG. 9 is one example of operation of step S31 in FIG. 8 and thus FIG. 9 circumstantially illustrates processes in the step.

First, the event data producer 11 references the event data control information 114a stored in the event data information management controller 114, as in the form of table shown in FIG. 4, to extract an event data conversion condition corresponding to the node of interest with the use of the node ID of the transmitter node (step S311).

Next, the event data producer 11 assesses the event data conversion conditions to determine whether or not event data is to be formed (step S312). When making a negative decision (No in step 312), the event data producer 11 terminates the process and discards the received node data.

By contrast, when making a positive decision (Yes in step S312), the event data producer 11 references the node data management information 115a stored in the node data manager 115 in the form of table as shown in FIG. 5 to extract the node values of the corresponding node with the use of the node ID of the sender node (step S313).

Next, the event data producer 11 applies the event data conversion rule and uses the extracted node value, and also uses the node value contained in the received node data to form an event value (step S314).

The event data producer 11 then forms the event data with the use of the formed event data and node ID (step S315) to have the event data sender 116 send the formed event data to the context producer 12 (step S316). The event data producer 11 then writes the received node value as a new node value into the node value column corresponding to the node ID in the node data management information 115a stored in the node data manager 115 (step S317).

In order to facilitate understanding the features of the present invention, reference will be made further to FIGS. 10 and 11 showing an example of set of data (node data and event data) input to and output by the event data producer 11, respectively. The node data shown in FIG. 10 is output by, for example, the node of human presence sensor, whose node value, or sensor value, increases or decreases significantly when detecting a person or object.

In this example, as described above with reference to FIG. 4, the event data information management controller 114 stores the event data control information 114a corresponding to the sixth to tenth lines of the event data management information 13a in FIG. 6, and therefore the event data formation suppression level is "2", so that the processes shown in FIG. 9 are executed. Also in FIG. 10, the unit of time is second, and the node ID is "2", so that two to five event data conversion rules in the event data control information shown in FIG. 4 are applied.

Also in the figure, the initial value of the event value is "FALSE", which is written in the node data manager 115. Further, five event data conversion rules are initially applied, and the initial value of "timep" is "NULL", i.e. "0", which represents a time having elapsed from when the event value "status" finally becomes "TRUE".

As shown in the third line of FIG. 10, at time "0", the node value is "0", and the current event value, that is, the stored event value, is "FALSE" as described above. The event data producer 11 applies the event data conversion rule No. 5 and then makes a positive decision to form event data, and updates the event value "status" of the node ID "2" in the node data manager 115 to "FALSE".

Next, as shown in the forth line of FIG. 10, at time "1", the input node value is "0". At this time, the current event value is "FALSE" as described above, so that this node data does not satisfy any event data conversion rules of the node ID "2" in the event data control information 114a, and hence the event data producer 11 discards this node data, and does not update the previous event data formation time "timep".

Next, as shown in the fifth line of FIG. 10, at time "2", the input node value is "12", which is more than "3", and the current event value "status" is "FALSE" as described above. Therefore, the event data producer 11 applies the rule No. 2 of the event data conversion rules to change the event value to "TRUE", as shown in the third line in FIG. 11, and then sends the formed event data to the context producer 12. After sending, the event data producer 11 has the node data manager 115 update the event value "status" of the node ID "2" to "TRUE". At this time, the event data producer 11 updates the value of the previous event data formation time "timep" to "2".

At time "3" in FIG. 10, the node value varies from "12" to "0", and the current event value "status" is "TRUE" as describe above, but this node value does not satisfy the condition "time≥timep+2" in the conditions of the rule No. 3 where the conditions "status=TRUE, value<3" and "time timep+2" are defined as shown in FIG. 4. The event data producer 11 therefore will not form the event value.

At time "4" in FIG. 10, the node value is "10", which is more than 3, and the current event value "status" is "TRUE". Therefore, this node value does not satisfy the condition "value<3" in the conditions of the rule No. 3 in FIG. 4, and thus the event data producer 11 will not form the event value. However, at time 4, the node value is "10", which does not satisfy the holding condition of the rule No. 3 in FIG. 4 and therefore the event data producer 11 updates the value of the time "timep" at which the previous event data was formed.

At time "5" in FIG. 10, the node value varies from "10" to "0", but this node value does not satisfied the condition "time timep 2" in the conditions of the rule No. 3 in FIG. 4. The event data producer 11 therefore will not form the event value.

At time "6" in FIG. 10, the node value is "0", which is less than "3", so that this node value satisfies the condition "value<3" in the conditions of the rule No. 3. Furthermore, the present event value "status" is "TRUE" and thus satisfies the condition "status=TURE" in the conditions of the rule No. 3. Further, the time "timep" is "4" at which the previous event data was formed, and thus has progressed two or more seconds since the time "timep" and satisfies the condition "time≥timep+2" in the conditions of the rule No. 3. The event data producer 11 therefore forms an event value and sends the event data. Then, the device updates the event value "status" of the node ID "2" in the node data manager 115 to "FALSE".

In this way, the event data producer 11 forms event values as shown in FIG. 11 where the data Nos. correspond to the respective times shown in FIG. 10.

Well, in order to further facilitate understanding the features of the present invention, reference will be made to FIGS. 12 and 13 showing an alternative example of a set of data (node data and event data) input to and output by the event data producer 11, respectively. FIG. 12 represents the data output by, for example, anode of temperature sensor, whose node value, e.g. sensor value, varies mildly and represents sensed temperature.

In this example, the event data formation suppression level is "2" as shown in FIG. 4, so that the processes shown in FIG. 9 are executed, and the node ID is "1", so that the rule No. 1 of the event data conversion rule in the event data control information shown in FIG. 4 is applied. The unit of time in FIG. 12 is minute =60 seconds.

As shown in the third line of FIG. 12, at time "0", the node value is an initial value "0", so that the event data producer 11 writes the node value "0" as an event value into the node data manager 115.

At time "1" in FIG. 12, the node value is "0", but this node value does not satisfy the conversion condition that "the temperature rises or drops by 2° C. or more" in the conversion conditions of the rule No. 1 shown in FIG. 4. The event data producer thus 11 will not form the event data and then discard this node data. Also, the event data producer 11 will not update the instant "timep" at which the previous event data was formed.

At time "2" in FIG. 12, the node value is "2", and thus this node value satisfies the conversion condition that "the temperature rises by 2° C. or more" in the conversion conditions of the rule No. 1 shown in FIG. 4, while the time "2" satisfies the conversion condition "time timep+60". The event data producer 11 therefore forms "2" as an event value for the event data. The event data producer 11 updates the event value of the node ID "1" in the node data manager 115 to "2".

The node values at times "3" and "4" in FIG. 12 are "2" and "3", respectively, so that each variation from the current event value, that is, stored event value, is "0" and "1". These variations do not satisfy the conversion condition that "the temperature rises by 2° C. or more" in the conversion conditions of the rule No. 1. The event data producer 11 therefore will not form the event data.

At time "5" in FIG. 12, the node value is "4", so that the variation from the stored event value of the node ID "1" is "2" and this node value satisfies the conversion condition that "the temperature rises by 2° C. or more" in the conversion conditions of the rule No. 1 shown in FIG. 4, while the time "5" satisfies the conversion condition "time≥timep+60". The event data producer 11 therefore forms an event value and also updates the event value of the node ID "1" in the node data manager 115 to "4".

At time "6" in FIG. 12, the node value is "7", so that the variation from the stored event value of the node ID "1" is "4" and this node value satisfies the conversion condition that "the temperature rises by 2° C. or more" in the conversion conditions of the rule No. 1 shown in FIG. 4, while the time "6" satisfies the conversion condition "time timep+60". The event data producer 11 therefore forms an event value and also updates the event value of the node ID "1" in the node data manager 115 to "7".

In this way, the event data producer 11 forms event values as shown in FIG. 13 where data Nos. correspond to the respective times shown in FIG. 12.

Note that, as shown in FIG. 14, the event data producer 11 may calculate an average value Q (t) of the received node data and the two latest sets of data, and form the event data when the average value Q(t) has varied by two or more. Specifically, when the average values Q(0), Q(1), ..., Q(6) of the received node data and the two latest values shown in FIG. 12 are calculated, the average values are as follows: at time "0" Q(0)=0.0, at time "1" Q(1)=0.0, at time "2" Q(2)=⅔, at time "3" Q(3)=⅘, at time "4" Q(4)=⅞≈2.3, at time "5" Q(5)=⅗, and at time "6" Q(6)=¹⁴⁄₃≈4.7. Thus, FIG. 14 shows the average values Q(0), Q(4) and Q(6) which vary by two or more. Note that, in FIG. 14, data Nos. correspond to the respective times shown in FIG. 12.

While the present invention has been described with reference to the particular illustrative embodiments, it is not to be restricted by the above-described embodiment, which may, however, be changed or modified without departing from the scope and spirit of the present invention. For example, although event data conversion conditions are held constant regarding event data management information once a node is connected, various conditions may be made variable after the connection of the node. For example, it was first required that the system be monitored for large variations. If a formation of other context utilizing the same node is added during the operation of the system and if it is necessary to monitor whether the added context minutely varies, a signal for shortening the time intervals for forming event data may be sent from the context producer 12 to the event data producer 11. The method of controlling the node and the event data conversion rules may be varied by updating the contents of the node management information 113a and event data control information 114a within the event data producer 11.

As a further example, when a statistical context using a large number of nodes is formed, a signal may be sent from the context producer 12 to the event data producer 11 to make stricter the conditions of the event data conversion rules in which the frequency at which event data is formed from each of the plural nodes 2_1 to 2_N so as to reduce the load on the input side of the context producer 12. Furthermore, when the nodes are reduced in number, a signal may be sent from the context producer 12 to the event data producer 11 to mitigate the conditions of the event data conversion rules.

According to the event data producer 11 associated with the present invention, when the node data having values related to events are input in large amount and frequently and when the number of entries of node data in the context producer 12 per unit time exceeds a threshold value, a suppressive control is performed to stop the formation of event data based on node data output by non-priority nodes to thereby reduce the number of formations of event data. Accordingly, the context producer 12 can form appropriate context information without increasing the amount of resources.

Furthermore, input data from priority nodes that require real-time performance are processed preferentially by controllably suppressing the number of formations of event data based on the node data output by non-priority nodes. It is possible to cope with a quick notice of state variations to the application. Therefore, the reliability of event values can be enhanced compared with the case where event data are merely thinned out.

The entire disclosure of Japanese patent application No. 2011-011088 filed on Jan. 21, 2011, including the specification, claims, accompanying drawings and abstract of the disclosure, is incorporated herein by reference in its entirety.

What I claim is:

1. A context-awareness system for use with a plurality of nodes, comprising:
    an event data producer means for receiving node data from the plurality of nodes and for forming, from node data including a node value relating to an event, event data including an event value converted from the node value;
    a context producer means for forming context information relating to the event from the event data; and
    an event data manager means for storing event data formation suppression information for suppressing a number of formations of event data per unit time depending on a number of entries of the event data into said context producer means per unit time and a priority order in forming the event data, the priority order being determined in advance, and for storing event data conversion rules for converting node values to event data for specific levels of event data formation suppression information,
    wherein said context producer means sends the number of entries of the event data per unit time to said event data manager means,
    wherein said event data manager means sends, from among the stored event data formation suppression information and event data conversion rules, event data formation suppression information that includes a priority order for forming the event data, and an event data conversion rule corresponding to the number of entries of the event data to said event data producer means, and
    wherein said event data producer means forms the event data based on the event data formation suppression information and the event data conversion rule sent from said event data manager means.

2. The context-awareness system in accordance with claim 1, wherein the node value is any one of a measurement value, a detected value and an input value regarding the event, and said node data includes, as node information on a node outputting the node value, at least one of an identification of the node, a type of the node and an installed position of the node.

3. The context-awareness system in accordance with claim 2, wherein the event data conversion rules are determined in advance further depending on the number of entries of the event data and the node information.

4. The context-awareness system in accordance with claim 3, wherein the event data conversion rules are determined depending on the number of entries of the event data and the type of the node or on the number of entries of the event data and the installed position of the node.

5. The context-awareness system in accordance with claim 1, wherein
    said event data producer means stores either of the node value and the event value as well as time information indicating time at which the node data is input, and
    said event data producer means forms the event data from newly obtained node data by using the time information and the stored node value or event value.

6. The context-awareness system in accordance with claim 5, wherein said event data producer means forms the event data when a difference between a node value indicated by the newly obtained node data and the stored node value or event value exceeds a predetermined range.

7. The context-awareness system in accordance with claim 1, wherein said event data producer means forms the event data when a same event value has persisted for a predetermined period of time since a difference arose between the stored event value or node value and a newly obtained event value.

8. The context-awareness system in accordance with claim 1, wherein said event data producer means uses the stored event value and two or more of obtained node values to calculate an average value or an amount of variation to determine a new event value.

9. A method for forming event data in a context-awareness system that receives node data from a plurality of nodes, said system comprising:

an event data producer means for forming, from node data including a node value relating to an event, event data including an event value converted from the node value;

a context producer means for forming context information relating to the event from the event data; and an event data manager means for storing event data formation suppression information for suppressing a number of formations of event data per unit time depending on a number of entries of the event data into the context producer means per unit time and a priority order in forming the event data, the priority order being determined in advance, and for storing event data conversion rules for converting node values to event data for specific levels of event data formation suppression information, wherein said method comprises:

sending by the context producer means the number of entries of the event data per unit time to the event data manager means;

sending by the event data manager means, from among the stored event data formation suppression information and event data conversion rules, event data formation suppression information and an event data conversion rule corresponding to the number of entries of the event data to the event data producer means; and forming the event data based on the event data formation suppression information that includes a priority order for forming the event data and the event data conversion rule sent from the event data manager means.

10. The context-awareness system in accordance with claim 1, wherein the event data conversion rules stipulate how to determine an event value contained in the event data.

11. The context-awareness system in accordance with claim 1, wherein the event data conversion rules are determined further depending on the number of entries of input event data and a node type.

12. The context-awareness system in accordance with claim 1, wherein the event data conversion rules are determined further depending on the number of entries of input event data and a node position.

13. The context-awareness system in accordance with claim 1, wherein the nodes are spaced apart from the context-awareness system.

14. The method in accordance with claim 9, wherein the nodes are spaced apart from the context-awareness system.

* * * * *